US007205029B2

(12) United States Patent
Ohrbom et al.

(10) Patent No.: US 7,205,029 B2
(45) Date of Patent: Apr. 17, 2007

(54) METHOD OF PROVIDING CURED COATING FILMS FREE OF POPPING DEFECTS

(75) Inventors: Walter H. Ohrbom, Hartland Township, MI (US); Sergio E. Balatan, West Bloomfield, MI (US); David J. Law, Livonia, MI (US); Robert D. Weise, Harper Woods, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 10/261,888

(22) Filed: Sep. 30, 2002

(65) Prior Publication Data

US 2004/0062871 A1 Apr. 1, 2004
US 2006/0257577 A9 Nov. 16, 2006

Related U.S. Application Data

(63) Continuation-in-part of application No. 09/741,511, filed on Dec. 19, 2000, now Pat. No. 6,541,594.

(51) Int. Cl.
*B05D 3/00* (2006.01)
(52) U.S. Cl. .................................. 427/385.5
(58) Field of Classification Search .............. 427/385.5
See application file for complete search history.

(56) References Cited

U.S. PATENT DOCUMENTS

| | | | |
|---|---|---|---|
| 4,118,427 A | 10/1978 | Rhein et al. | |
| 4,118,437 A | 10/1978 | Parekh | |
| 4,246,376 A | 1/1981 | Didomenico, Jr. | 525/398 |
| 4,546,120 A | 10/1985 | Perrman et al. | 521/159 |
| 5,236,987 A | 8/1993 | Arendt | |
| 5,334,650 A | 8/1994 | Serdiuk et al. | 524/591 |
| 5,532,061 A * | 7/1996 | Menovcik et al. | 428/423.1 |
| 5,587,428 A | 12/1996 | Jones et al. | 525/165 |
| 5,665,433 A | 9/1997 | Moussa et al. | |
| 5,688,867 A | 11/1997 | Scheibelhoffer et al. | 525/168 |
| 5,783,272 A | 7/1998 | Wong | |
| 5,814,410 A | 9/1998 | Singer et al. | |
| 5,976,615 A | 11/1999 | Menovcik et al. | |
| 5,976,701 A * | 11/1999 | Barancyk et al. | 428/423.1 |
| 2002/0086966 A1 | 7/2002 | Weise et al. | |
| 2002/0107325 A1 | 8/2002 | Gilbert et al. | |

FOREIGN PATENT DOCUMENTS

| | | |
|---|---|---|
| EP | 0 026 984 | 9/1980 |
| WO | WO 91/11476 | 8/1991 |
| WO | WO 95/19997 | 7/1995 |
| WO | WO 96/23034 | 1/1996 |
| WO | WO 96/23035 | 1/1996 |
| WO | WO 96/29371 | 9/1996 |
| WO | WO 99/35189 | 7/1999 |
| WO | WO 00 / 12566 * | 3/2000 |
| WO | WO 02/50203 | 6/2002 |

OTHER PUBLICATIONS

English Translation of International Search Report for PCT/US03/20852, International filing Date Jul. 1, 2003.
Frank N. Jones, "End-Grafting of Oligoesters Based on Terephthalic Acid and Liner Diols for High Solids Coatings", Apr. 21, 1995, pp. 1609-1618.
Robson F. Storey et al., "Proceedings of the twenty-fourth international waterborne, high-solids, and powder coatings symposium", Feb. 5-7, 1997, pages title, & 1-21.
Frank N. Jones et al. "Recent studies of self-condensation and co-condensation of melamine-formaldehyde resins; cure at low temperatures", (1994), pp. 189-208.
Robson F. Storey et al., "Proceedings of the twenty-fourth international waterborne, high-solids, and powder coatings symposium", Feb. 21-23, 1990, pages title, & 447-470.
Shubang Gan et al, "Recent studies of the curing of polyester-melamine enamels, possible causes of overbake softening", Feb 1-3, 1989, pp. 87-109.
Walter H. Ohrbom et al., U.S. Appl. No. 10/261,427, filed Sep. 30, 2002, pp. 1-23, and abstract.
Walter H. Ohrbom et al., U.S. Appl. No. 10/261,428, filed Sep. 30, 2002, pp. 1-33, and abstract.

* cited by examiner

*Primary Examiner*—Erma Cameron

(57) ABSTRACT

A method for providing cured coating films free of popping defects. The method requires the application to a substrate of at least 2.0 mils/50.8 microns of a uncured curable coating composition comprising an anti-popping component (a), a film-forming component (b), and a crosslinking component (c), wherein anti-popping component (a) has from 12 to 72 carbon atoms, is substantially free of any heteroatoms, is not a crystalline solid at room temperature and comprises a mixture of two or more structures selected from the group consisting of aliphatic structures for anti-popping component (a), aromatic-containing structures for anti-popping component (a), cycloaliphatic-containing structures for anti-popping component (a), and mixtures thereof, at least one of the two or more structures being a cycloaliphatic-containing structure or an aromatic-containing structure. The coated uncured substrate is cured to provide a cured film free of popping defects with an average film build of at least 2.0 mils/50.8 microns.

3 Claims, No Drawings

METHOD OF PROVIDING CURED COATING FILMS FREE OF POPPING DEFECTS

This invention relates to coating compositions, especially thermoset coating compositions intended for use in the automotive and/or transportation industries. This application is a continuation-in-part application of U.S. patent application Ser. No. 09/741,511, filed Dec. 19, 2000 now U.S. Pat. No. 6,541,594.

BACKGROUND OF THE INVENTION

Curable coating compositions, especially thermoset coatings, are widely used in the coatings art. They are often used as topcoats in the automotive and industrial coatings industry. Color-plus-clear composite coatings are particularly useful as topcoats where exceptional gloss, depth of color, distinctness of image, or special metallic effects are desired. The automotive industry has made extensive use of these coatings for automotive body panels.

The effect of the coating process on the environment and the effect of the environment on coatings have increasingly shaped the coatings art in the last few decades. The industry has put considerable effort into developing coatings with materials that will be less harmful toward the environment. Examples of coatings that generally contain lower levels of volatile organic compounds include waterborne coatings, powder coatings, and high solids solvent borne coatings.

However, it has been difficult to devise environmentally sensitive coatings that simultaneously provided desirable resistance to environmental degradation and superior finished film performance properties.

For example, color-plus-clear composite coatings require an extremely high degree of clarity and low degree of visual aberrations at the surface of the coating in order to achieve a high distinctness of image (DOI). As a result, these coatings are especially susceptible to a phenomenon known as environmental etch. Environmental etch manifests itself as spots or marks on or in the finish of the coating that often cannot be rubbed out.

It is often difficult to predict the degree of resistance to environmental etch that a high gloss or color-plus-clear composite coating will exhibit. Many coating compositions known for their durability and/or weatherability when used in exterior paints do not provide the desired level of resistance to environmental etch when used in high gloss coatings such as the clearcoat of a color-plus-clear composite coating. Many compositions have been proposed for use as the film-forming component of the clearcoat of a color-plus-clear composite coating. Examples that address the problem of environmental etch resistance include carbamate-aminoplast systems, polyurethanes, acid-epoxy systems and the like. However, several of these prior art systems are vulnerable to application problems.

For example, many prior art coating compositions show an unacceptable tendency to form popping defects at commercially mandated film builds in commercial application environments. A "pop" or "popping defect" as used herein refers to the circular defects or holes that are visible only after the curing of the applied coating film. It should be noted that such defects might also be referred to as "gassing defects" with respect to powder coating compositions and applications. These popping defects are believed to result from the upward passage of volatile gases from the curing film. Such gases may be trapped air, volatile solvents or the volatile by-products of crosslinking reactions. The frequency of pop defects may range from the intermittent to large tightly packed masses of hundreds of individual defects. In either case, the presence of these popping or gassing defects often renders the cured surface commercially unacceptable.

Coating compositions used as topcoats are especially vulnerable to this problem due to their higher film build requirements. Clearcoat coating compositions used in automotive OEM applications need particularly good popping resistance because they are especially vulnerable because they typically require at least 2.5 mils/63.5 microns of applied uncured coating film, more often from 2.6 to 6.0 mils/66.0 to 1524 microns of applied uncured clearcoat, preferably from about 3.0 to 4.8 mil/76.2 to 121.9 microns of applied uncured clearcoat, and most preferably from about 3.6 to 4.6 mils/91.4 to 116.8 microns of applied uncured clearcoat. These high levels of applied uncured coating are often necessary to achieve at least 1.3 mils/33.0 microns of cured coating film, more particularly from 1.3 to 3.0 mils/33.0 to 76.2 microns, and most preferably from about 1.3 to 2.0 mils/33.0 to 50.8 microns of cured coating film.

"Pop resistance" or "pop tolerance" as used herein refers to the resistance of an applied coating at increasing film builds to form bubbles or pops at the surface of the film before or during the curing of the applied film. Coating composition having poor pop resistance will often show popping defects at the edges of parts where paint collects in film builds thicker than that normally intended. Coating compositions having the most desirable pop resistance will not form pop defects until applied at film builds generally greater than those encountered in commercial application environments.

Because of the significant losses in time and resources attributable to popping defects, it would be advantageous to provide a method of improving the popping resistance of coating compositions, especially those intended for use in the automotive industry that have desirable etch resistance. At the same time, such method must produce improvements without any decrease in environmental etch resistance or other commercially required performance property.

It would be particularly desirable to provide a method of improving the popping resistance of coating compositions, especially those intended for use as the clearcoat layer in color-plus-clear composite coatings.

SUMMARY OF THE INVENTION

It has unexpectedly been found that these and other objects of the invention can be achieved with the method of the invention. The method of the invention provides a cured coating film having an average film build of at least 2.0 mils/50.8 microns that is substantially free of popping defects.

The method of the invention requires the application of a curable coating composition to a substrate to form a coated uncured substrate having an average film build of at least 2.0 mils/50.8 microns. The curable coating composition applied to the substrate must comprise an anti-popping component (a), a film-forming component (b), and a crosslinking component (c).

Anti-popping component (a) has from 12 to 72 carbon atoms, is substantially free of any heteroatoms, is not a crystalline solid at room temperature and comprises a mixture of two or more structures selected from the group consisting of aliphatic structures for anti-popping component (a), aromatic-containing structures for anti-popping component (a), cycloaliphatic-containing structures for anti-popping component (a), and mixtures thereof, wherein at least one of the two or more structures is either a cycloaliphatic-containing structure or an aromatic-containing structure.

The resulting coated and uncured substrate is then subjected to conditions sufficient to form a continuous cured coating film having an average film build of at least 2.0 mils/50.8 microns and which is substantially free of popping defects.

DETAILED DESCRIPTION OF THE PREFERRED EMBODIMENTS

The method of the invention requires the use of coating compositions containing an anti-popping component (a), a binder or film-forming component (b) and a crosslinking component (c).

Anti-popping component (a) should have from 12 to 72 carbons, have at least two functional groups (ii), be substantially free of heteroatoms, and not be a crystalline solid at room temperature.

The anti-popping component (a) of the invention will generally have from 12 to 72 carbons, more preferably from 18 to 54 carbons, and most preferably from 36 to 54 carbons. In a particularly preferred embodiment of the invention, the anti-popping component (a) will have 36 carbons.

"Heteroatoms" as used herein refers to atoms other than carbon or hydrogen. The phrase "substantially without" heteroatoms as used herein means that the portion of anti-popping component (a) which does not include functional groups (ii) will generally have no more than two atoms which are other than carbon or hydrogen, i.e., atoms such as N, O, Si, mixtures thereof, and the like. More preferably, that portion of anti-popping component (a) that does not include functional groups (ii) will have no more than one atom that is other than carbon or hydrogen. In a most preferred embodiment, that portion of anti-popping component (a) that does not include functional groups (ii) will have no heteroatoms, i.e., will consist solely of carbon and hydrogen atoms. Thus, in a most preferred aspect of the invention, the only heteroatoms in anti-popping component (a) will be present in functional groups (ii).

It is another aspect of the invention that anti-popping component (a) will not be a crystalline solid at room temperature, i.e., at temperatures of from 65 to 75° F. "Crystalline" refers to a solid characterized by a regular, ordered arrangement of particles. Rather, anti-popping component (a) will be an amorphous solid, a wax or a liquid at room temperature. "Amorphous" refers to a noncrystalline solid with no well-defined ordered structure.

In a more preferred embodiment of the invention, anti-popping component (a) will comprise a mixture of two or more saturated or unsaturated structures selected from the group consisting of noncyclic structures for anti-popping component (a), aromatic-containing structures for anti-popping component (a), cyclic-containing structures for anti-popping component (a), and mixtures thereof. Saturated structures and aromatic structures that are free of non-aromatic unsaturated sites are preferred, especially where durability issues are of concern. For example, a most preferred anti-popping component (a) will comprise a mixture of two or more structures selected from the group consisting of aliphatic structures for anti-popping component (a), aromatic-containing structures for anti-popping component (a), cycloaliphatic-containing structures for anti-popping component (a), and mixtures thereof.

It is particularly preferred that anti-popping component (a) comprise at least two, more preferably three, of the three cited structures. If anti-popping component (a) comprises only two of the three cited structures for anti-popping component (a), then at least one of the two structures must be present as a mixture of two or more isomers thereof.

For example, the mixture of anti-popping components (a) may comprise at least one aliphatic structure for anti-popping component (a) and at least one other structure for anti-popping component (a) selected from the group consisting of aromatic-containing structures for anti-popping component (a), cycloaliphatic-containing structures for anti-popping component (a), and mixtures thereof. If the 'at least one other structure for anti-popping component (a)' is not a mixture of aromatic-containing structures for anti-popping component (a) and cycloaliphatic-containing structures for anti-popping component (a), either the aromatic-containing structures or the cycloaliphatic containing structures must be present as a mixture of two or more isomers.

Alternatively, the mixture of anti-popping components (a) may comprise at least one aromatic-containing structure for anti-popping component (a) and at least one other structure for anti-popping component (a) selected from the group consisting of aliphatic structures for anti-popping component (a), cycloaliphatic-containing structures for anti-popping component (a), and mixtures thereof. If the 'at least one other structure for anti-popping component (a)' is not a mixture of aliphatic structures for anti-popping component (a) and cycloaliphatic-containing structures for anti-popping component (a), either the aliphatic structures or the cycloaliphatic containing structures must be present as a mixture of two or more isomers.

In one preferred embodiment, anti-popping component (a) will comprise a mixture of two or more structures selected from the group consisting of aliphatic structures for anti-popping component (a), aromatic-containing structures for anti-popping component (a), cycloaliphatic-containing structures for anti-popping component (a), and mixtures thereof, wherein at least one of the two or more structures is either a cycloaliphatic-containing structure or an aromatic-containing structure.

In a most preferred embodiment, anti-popping component (a) will comprise one or more aliphatic structures for anti-popping component (a), one or more aromatic-containing structures for anti-popping component (a), and one or more cycloaliphatic-containing structures for anti-popping component (a).

Particularly advantageous mixtures of anti-popping component (a) will comprise from 3 to 25% by weight of anti-popping component (a) having an aliphatic structure, from 3 to 25% by weight of anti-popping component (a) having an aromatic-containing structure, and 50 to 94% by weight of anti-popping component (a) having a cycloaliphatic-containing structure. More preferred mixtures of anti-popping component (a) will comprise from 3 to 18% by weight of anti-popping component (a) having an aliphatic structure, from 5 to 23% by weight of anti-popping component (a) having an aromatic-containing structure, and 55 to 85% by weight of anti-popping component (a) having a cycloaliphatic-containing structure. Most preferred mixtures of anti-popping component (a) will comprise from 5 to 10% by weight of anti-popping component (a) having an aliphatic structure, from 10 to 20% by weight of anti-popping component (a) having an aromatic-containing structure, and 60 to 70% by weight of anti-popping component (a) having a cycloaliphatic-containing structure.

Finally, anti-popping component (a) must comprise at least two functional groups (ii). Preferred anti-popping components (a) may have from two to six functional groups (ii) while most preferably anti-popping component (a) will have two to three functional groups (ii).

Functional groups (ii) may be selected from a variety of active hydrogen containing groups and groups reactive with such active hydrogen containing groups. While it is most preferred that anti-popping components (a) enter into and be a part of the film-forming reaction, it is not a requirement of the invention that anti-popping component (a) be crosslinkable with either film-forming component (b) or crosslinking component (c).

Thus, in one alternative embodiment of the invention, anti-popping component (a) will not be a part of the film-forming reaction. In this embodiment of the method of the invention, the functional groups (ii) of anti-popping component (a) will be chosen so as not to be reactable with either the functional groups (iii) of crosslinking component (c) or any functional groups of any film-forming components (b) present in the coating compositions of the invention. In this embodiment, film-forming reactions will most preferably occur between film-forming component (b) and crosslinking component (c).

In another embodiment of the invention, the functional groups (ii) of anti-popping component (a) will be reactable with the functional groups of one or more film-forming components (b) present in the coating composition of the invention. In a more preferred version of this embodiment, at least one of film-forming components (b) or anti-popping component (a) will also be reactable with crosslinking component (c).

In an alternative embodiment, the functional groups (ii) of anti-popping component (a) will be reactable with one or more functional groups (iii) of one or more crosslinking components (c).

In another embodiment, functional groups (ii) of anti-popping component (a) will be reactable with both of the functional groups of film-forming component (b) and crosslinking component (c). It will be appreciated that in this instance, there may be more than one type of functional group (ii) on anti-popping component (a). That is, anti-popping component (a) may comprise two or more different functional groups (ii).

It is most preferred that functional group (ii) be reactable with at least one functional group (iii) of crosslinking component (c) and not with any film-forming components (b).

The above noted film-forming reactions may produce chemical linkages that may or may not be thermally reversible. However, in a most preferred embodiment of the invention, the functional groups (ii) of anti-popping component (a) and the functional groups (iii) of crosslinking component (c) will be selected so that reaction there between results in a thermally irreversible chemical linkage. The term "thermally irreversible linkage" as used herein refers to a linkage the reversal of which is not thermally favored under the traditional cure schedules used for automotive coating compositions. Illustrative examples of suitable thermally irreversible chemical linkages are urethanes, ureas, esters and non-aminoplast ethers. Preferred thermally irreversible chemical linkages are urethanes, ureas and esters, with urethane linkages being most preferred. Such chemical linkages will not break and reform during the crosslinking process as is the case with the linkages formed via reaction between hydroxyl groups and aminoplast resins.

Certain "pairs" of functional groups will produce such thermally irreversible chemical linkages. If one member of a "pair" is selected for use as functional group (ii), the other member of the "pair" will be selected as the functional group of the compound or material intended to react with anti-popping component (a), i.e., either one or both of film-forming component (b) and crosslinking component (c), most preferably as functional group (iii) of crosslinking agent (c).

Examples of illustrative reactant or functional group "pairs" producing thermally irreversible linkages are hydroxy/isocyanate (blocked or unblocked), hydroxy/epoxy, carbamate/aminoplast, carbamate/aldehyde, acid/epoxy, amine/cyclic carbonate, amine/isocyanate (blocked or unblocked), urea/aminoplast, and the like.

Illustrative functional groups (ii) will preferably be selected from the group consisting of carboxyl, hydroxyl, aminoplast functional groups, urea, carbamate, isocyanate, (blocked or unblocked), epoxy, cyclic carbonate, amine, aldehyde and mixtures thereof. Preferred functional groups (ii) are hydroxyl, primary carbamate, isocyanate, aminoplast functional groups, epoxy, carboxyl and mixtures thereof. Most preferred functional groups (ii) are hydroxyl, primary carbamate, and mixtures thereof. These preferences pertain regardless of whether a thermally reversible or irreversible linkage is desired. It will be appreciated by those of skill in the art that it is the selection of a corresponding reactable functional groups in either film-forming components (b) or crosslinking components (c) that determine whether resulting linkages will be thermally reversible or irreversible.

Aminoplast functional groups may be defined as those functional groups resulting from the reaction of an activated amine group and an aldehyde or a formaldehyde. Illustrative activated amine groups are melamine, glycoluril, benzoguanamine, amides, carbamates, and the like. The resulting reaction product may be used directly as functional group (ii) or may be etherified with an alcohol prior to use as functional group (ii). The aminoplast may be further modified to change some of its basic properties, for example, by the reaction with amides, to raise the $T_g$ of the resulting material for use in powder coatings, as discussed in Balwant in U.S. Pat. No. 5,665,852.

Amine groups suitable for use as functional group (ii) may be primary or secondary, but primary amines are most preferred.

Illustrative examples of suitable anti-popping components (a) having functional groups (ii) which are carboxyl are fatty acids and addition reaction products thereof, such as dimerized, trimerized and tetramerized fatty acid reaction products and higher oligomers thereof. Suitable acid functional dimers and higher oligomers may be obtained by the addition reaction of C12–18 monofunctional fatty acids. Suitable monofunctional fatty acids may be obtained from Cognis Corporation of Ambler, Pa. Such materials will be acid functional and will contain some unsaturation. In addition, saturated and unsaturated dimerized fatty acids are commercially available from Uniqema of Wilmington, Del.

Hydroxyl functional anti-popping components (a) are commercially available as the Pripol™ saturated fatty acid dimer (Pripol™ 2033) supplied by Uniqema of Wilmington, Del. Hydroxyl functional anti-popping components (a) may also be obtained by reduction of the acid group of the above-discussed fatty acids.

Anti-popping components (a) having two or more carbamate functional groups may be obtained via the reaction of the hydroxyl functional anti-popping components (a) with a low molecular weight carbamate functional monomer such as methyl carbamate under appropriate reaction conditions. Alternatively, carbamate functional anti-popping components (a) may be made via the decomposition of urea in the presence of hydroxyl functional anti-popping component (a) as described above. Finally, carbamate functional anti-popping components (a) can be obtained via the reaction of phosgene with the hydroxyl functional anti-popping component (a) followed by reaction with ammonia.

Anti-popping components (a) having amine functional groups (ii) may be obtained via reaction of the acid functional component (a) to form an amide, followed by conversion to a nitrile and subsequent reduction to an amine.

Anti-popping components (a) having isocyanate functional groups (ii) made be obtained via reaction of the amine functional component (a) described above with carbon dioxide.

Anti-popping components (a) having aminoplast functional groups (ii) may be made via reaction of carbamate or amide functional anti-popping component (a) as described above with formaldehyde or aldehyde. The resulting reaction product may optionally be etherified with low boiling point alcohols.

Anti-popping components (a) having aldehyde functional groups (ii) may be made via reduction of the acid functional anti-popping components (a) described above.

Anti-popping components (a) having urea functional groups (ii) may be made via reaction of an amine functional component (a) with urea. Alternatively, amine functional component (a) can be reacted with phosgene followed by reaction with ammonia to produce the desired urea functional groups (ii).

Anti-popping components (a) having epoxy functional groups (ii) may be made using either saturated or unsaturated fatty acids described above. If an unsaturated fatty acid is used, reaction with peroxide will form internal epoxy groups. More preferably, an acid or hydroxyl functional anti-popping component (a) will be reacted with epichlorohydrin. Preferred epoxy functional anti-popping components (a) will be obtained using saturated starting materials.

Anti-popping components (a) having cyclic carbonate functional groups (ii) may be made via carbon dioxide insertion into an epoxy functional anti-popping component (a) as described above.

A most preferred example for anti-popping component (a) will be a mixture of the following structures:

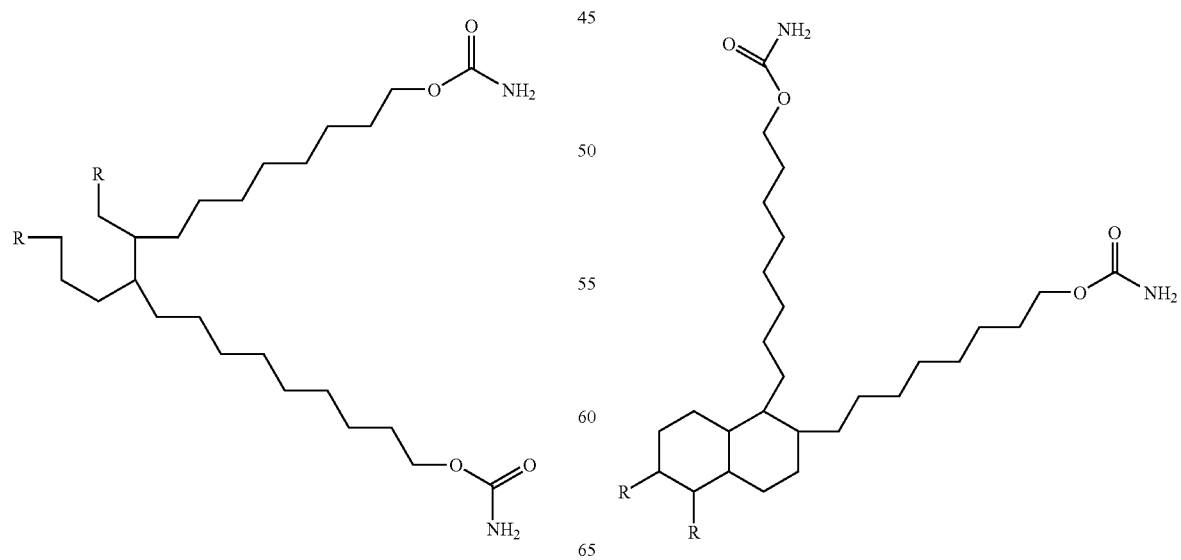

-continued

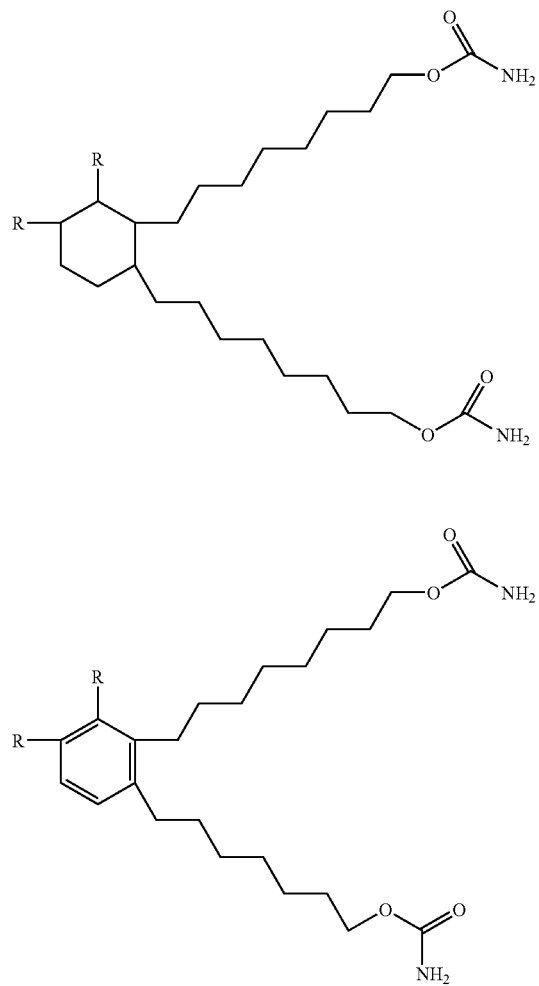

-continued

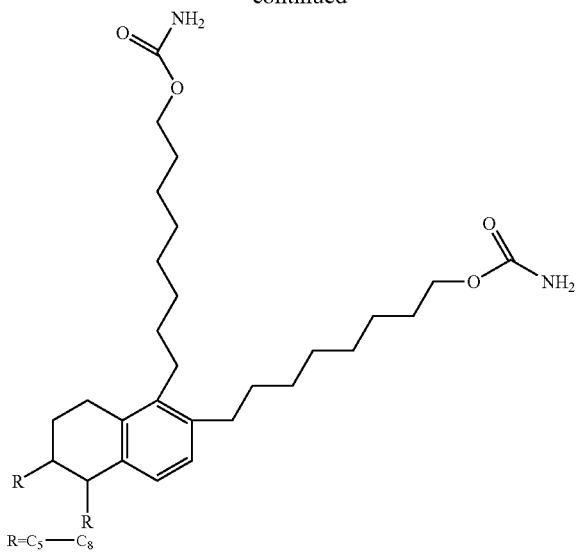

R=C$_5$—C$_8$

Anti-popping component (a) will generally be present in liquid coating compositions used in the claimed method in amounts of from 1.0 to 80.0, more preferably from 3.0 to 75 and most preferably from 5.0 to 70.0, all % by weight based on the total nonvolatile weight of the film-forming components of the curable composition. Anti-popping component (a) will generally be present in powder coating compositions used in the claimed method in amounts of from 1.0 to 30.0, more preferably from 2.0 to 20.0 and most preferably from 5.0 to 15.0, all % by weight based on the total nonvolatile weight of the film-forming components of the curable composition.

The method of the invention requires that anti-popping component (a) be incorporated into coating compositions comprising a film-forming or binder component (b) and a crosslinking component (c).

Suitable binder or film-forming component (b) will generally be one or more polymer resins or oligomers having active hydrogen-containing functional groups. Such polymer resins include, for example, acrylic polymers, modified acrylic polymers, polyesters, polyepoxides, polycarbonates, polyurethanes, polyamides, polyimides, polysiloxanes, and mixtures thereof, all of which are known in the art. Preferably, the polymer is an acrylic, modified acrylic or polyester. More preferably, the polymer is an acrylic polymer. Active hydrogen-containing functional groups on polymer resins are well known in the art. Such groups include, for example, hydroxyl groups, amino groups, thiol groups, hydrazide groups, carbamate groups, activated methylene groups, and mixtures thereof.

In one preferred embodiment of the invention, the polymer is an acrylic. The acrylic polymer preferably has a molecular weight of 500 to 1,000,000, and more preferably of 1500 to 50,000. As used herein, "molecular weight" refers to number average molecular weight, which may be determined by the GPC method using a polystyrene standard. Such polymers are well-known in the art, and can be prepared from monomers such as methyl acrylate, acrylic acid, methacrylic acid, methyl methacrylate, butyl methacrylate, cyclohexyl methacrylate, and the like. The active hydrogen functional group, e.g., hydroxyl, can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, and the like. Amino-functional acrylic monomers would include t-butylaminoethyl methacrylate and t-butylamino-ethylacrylate. Other acrylic monomers having active hydrogen functional groups in the ester portion of the monomer are also within the skill of the art.

Modified acrylics can also be used as the film-forming component (b) in the coating compositions utilized in the method of the invention. Such acrylics may be polyester-modified acrylics or polyurethane-modified acrylics, as is well known in the art. Polyester-modified acrylics modified with ε-caprolactone are described in U.S. Pat. No. 4,546,046 of Etzell et al, the disclosure of which is incorporated herein by reference. Polyurethane-modified acrylics are also well known in the art. They are described, for example, in U.S. Pat. No. 4,584,354, the disclosure of which is incorporated herein by reference.

Polyesters having active hydrogen groups such as hydroxyl groups can also be used as the polymer in the composition according to the invention. Such polyesters are well known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Polyurethanes having active hydrogen functional groups are also well known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

Carbamate functional polymers and oligomers can also be used as film-forming component (b), especially those having at least one primary carbamate group and are most preferred for use as film-forming component (b).

Carbamate functional examples of binder component (b) used in the coating compositions employed in the method of the invention can be prepared in a variety of ways. One way to prepare such polymers is to prepare an acrylic monomer having carbamate functionality in the ester portion of the monomer. Such monomers are well known in the art and are described, for example in U.S. Pat. Nos. 3,479,328, 3,674,838, 4,126,747, 4,279,833, and 4,340,497, 5,356,669, and WO 94/10211, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically unsaturated monomers, if desired, by techniques well known in the art.

An alternative route for preparing the binder or film-forming component (b) is to react an already-formed polymer such as an acrylic polymer with another component to form a carbamate-functional group appended to the polymer backbone, as described in U.S. Pat. No. 4,758,632. One technique for preparing polymers useful as component (A) involves thermally decomposing urea (to give off ammonia and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. Another technique is to transcarbamylate a hydroxy-functional acrylic polymer with an alkyl carbamate. A more difficult, but feasible way of preparing the polymer would be to trans-esterify an acrylate polymer with a hydroxyalkyl carbamate.

Suitable carbamate functional examples of film-forming component (b) will generally have a molecular weight of 2000–20,000, and preferably from 3000–6000. As used herein, molecular weight means number average molecular weight, and can be determined by the GPC method using a polystyrene standard. The carbamate content of the polymer, on a molecular weight per equivalent of carbamate functionality, will generally be between 200 and 1500, and preferably between 300 and 500. The glass transition temperature, $T_g$, of components (A) and (B) can be adjusted to achieve a cured coating having the $T_g$ for the particular application involved.

An illustrative example of a carbamate functional acrylic resin suitable for use as a film-forming component (b) can be represented by the randomly repeating units according to the following formula:

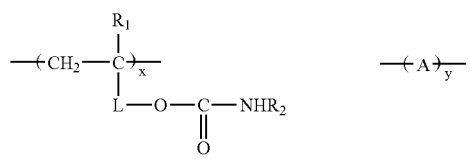

wherein, $R_1$ represents H or $CH_3$. R2 represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

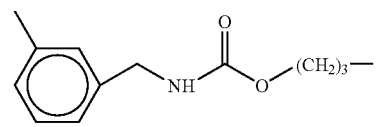

—$(CH_2)$—, —$(CH_2)_2$—, —$(CH_2)_4$—, and the like. In one preferred embodiment, -L- is represented by —COO-L'— where L' is a divalent linking group. Thus, in a preferred embodiment of the invention, the binder or film-forming component (b) is represented by randomly repeating units according to the following formula:

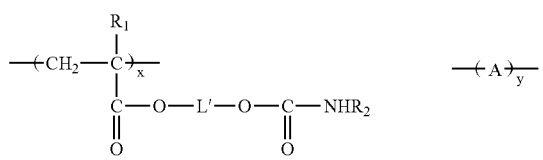

In this formula, $R_1$, $R_2$, A, x, and y are as defined above. L' may be a divalent aliphatic linking group, preferably of 1 to 8 carbon atoms, e.g., —$(CH_2)$—, —$(CH_2)_2$—, —$(CH_2)_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate.

A most preferred carbamate and hydroxyl functional polymer can be described as follows.

The most preferred carbamate functional film-forming component (b) will have a number average molecular weight of from 1000 to 5000, a carbamate equivalent weight of from 300 to 600, and a Tg of from 0 to 150° C. A most preferred carbamate-functional component (b) will have a number average molecular weight of from 1500 to 3000, a carbamate equivalent weight of from 350 to 500, and a Tg of from 25 to 100° C.

This carbamate functional film-forming component (b) will have from at least 66 to 100% by weight, based on the total weight of the polymer, of one or more repeat units A selected from the group consisting of

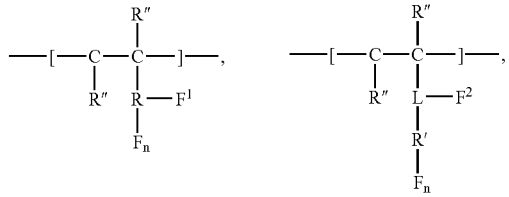

and mixtures thereof, and and from 0 to less than 35% by weight, based on the total weight of the polymer, of one or more repeat units A' having the structure

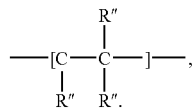

and

More preferably, this most preferred carbamate functional polymer (b) will have from 80 to 100 weight percent of one or more repeat units A and from 20 to 0 weight percent of one or more repeat units A', and most preferably, from 90 to 100 weight percent of one or more repeat units A and from 10 to 0 weight percent of one or more repeat units A', based on the total weight of the final carbamate functional polymer. A particularly preferred carbamate functional polymer of the invention will have more than 90 weight percent of one or more repeat units A and less than 10 weight percent, preferably between 1 and 9 weight percent, of one or more repeat units A', based on the total weight of the carbamate functional polymer of the invention.

In the above, R is an at least divalent nonfunctional linking group having from 1 to 60 carbon atoms and from 0 to 20 heteroatoms selected from the group consisting of oxygen, nitrogen, sulfur, phosphorus, and silane, and mixtures thereof. As used here, "nonfunctional" refers to the absence of groups that are reactive with crosslinking agents under traditional coating curing conditions.

Illustrative examples of suitable R groups are aliphatic or cycloaliphatic linking groups of from 1 to 60 carbons, aromatic linking groups of from 1 to 10 carbons, and mixtures thereof. Preferred R groups include aliphatic or cycloaliphatic groups of from 2 to 10 carbons. R may, and preferably will, include one or more heteroatoms via one or more divalent internal linking groups such as esters, amides, secondary carbamates, ethers, secondary ureas, ketones, and mixtures thereof. Internal linking groups selected from the group consisting of esters, secondary carbamates, and mixtures thereof, are more preferred, with esters being most preferred.

Examples of particularly preferred R groups are set forth below. Note that $F^1$ is not part of R but is shown in the structures below to provide perspective.

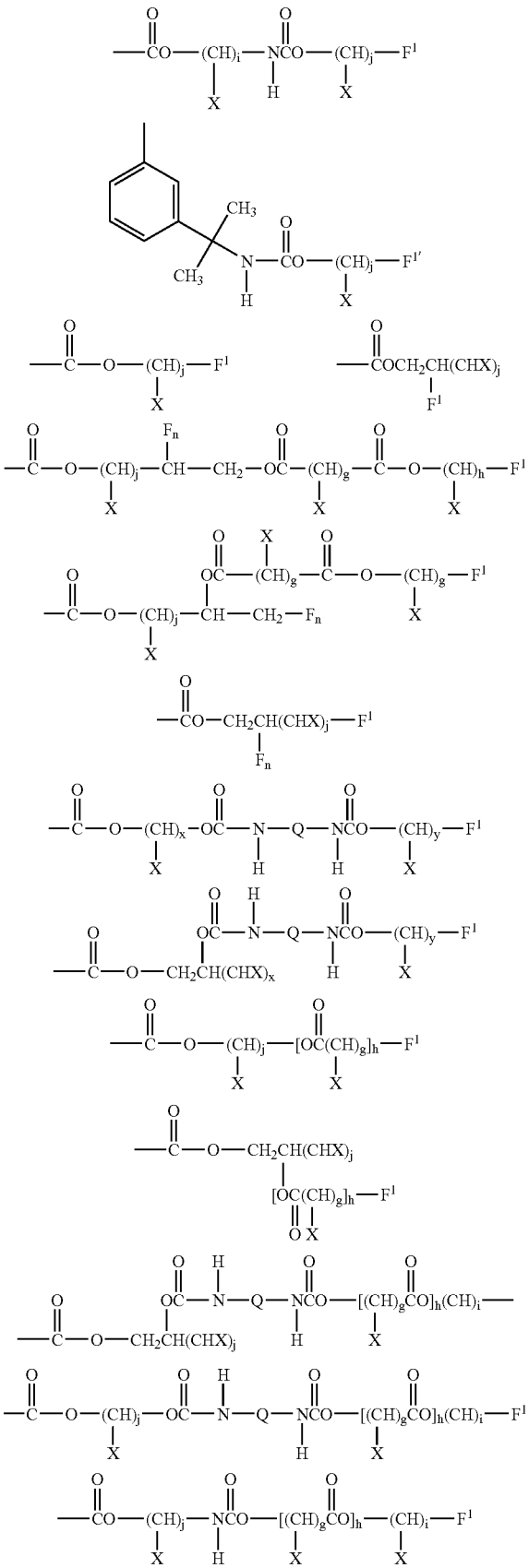

-continued

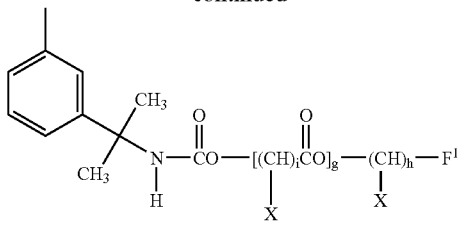

and isomers thereof, wherein X is H or is a a monovalent nonfunctional linking group having from 1 to 20 carbon atoms and from 0 to 20 heteroatoms selected from the group consisting of oxygen, nitrogen, sulfur, phosphorus, and silane, and mixtures thereof; i, j, g, and h are intergers from 0 to 8; and Q is an at least divalent nonfunctional linking group having from 1 to 60 carbon atoms and from 0 to 20 heteroatoms selected from the group consisting of oxygen, nitrogen, sulfur, phosphorus, and silane, and mixtures thereof.

A most preferred R group is

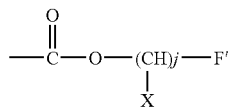

wherein j is from 1 to 6 and X is as defined above.

R' is an at least monovalent nonfunctional linking group having from 1 to 60 carbon atoms and from 0 to 20 heteroatoms selected from the group consisting of oxygen, nitrogen, sulfur, phosphorus, and silane, and mixtures thereof. As used here, "nonfunctional" refers to the absence of groups that are reactive with crosslinking agents under traditional coating curing conditions.

Illustrative examples of suitable R' groups are aliphatic or cycloaliphatic linking groups of from 1 to 60 carbons, aromatic linking groups of from 1 to 10 carbons, and mixtures thereof. Preferred R' groups include aliphatic or cycloaliphatic groups of from 2 to 10 carbons. R' may, and preferably will, include one or more heteroatoms via one or more divalent internal linking groups such as esters, amides, secondary carbamates, ethers, secondary ureas, ketones, and mixtures thereof. The use of esters as internal linking groups is most preferred.

Examples of particularly preferred R' groups are

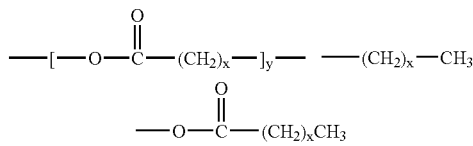

wherein x and y are from 0 to 10, preferably from 3 to 8.

In a preferred embodiment, the at least monovalent nonfunctional linking group R' will comprise at least one branched alkyl group of from 5 to 20 carbons, preferably from 5 to 15 carbons and most preferably from 8 to 12 carbons. An example of an especially suitable structure for incorporation into linking group R' is

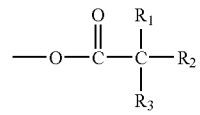

wherein $R_1$, $R_2$, and $R_3$ are alkyl groups of from 1 to 10 carbons each. Most preferably, $R_1$, $R_2$, and $R_3$ will total from 8 to 12 carbons with at least one of $R_1$, $R_2$, and $R_3$ being methyl group. In a most preferred embodiment, n will be 0 when R' comprises this branched alkyl structure.

R" is H or a monovalent nonfunctional linking group having from 1 to 20 carbon atoms and from 0 to 20 heteroatoms selected from the group consisting of oxygen, nitrogen, sulfur, phosphorus, and silane, and mixtures thereof.

Illustrative examples of suitable R" groups are hydrogen, aliphatic or cycloaliphatic linking groups of from 1 to 60 carbons, aromatic linking groups of from 1 to 10 carbons, and mixtures thereof. R" may, and preferably will, include one or more heteroatoms via one or more divalent internal linking groups such as esters, amides, secondary carbamates, ethers, secondary ureas, ketones, and mixtures thereof.

Preferred R" groups are H, —$CH_3$, aromatic groups such as benzyl, and alkyl esters of from 2 to 10 carbons, especially from 4 to 8 carbons. H and methyl are most preferred as R".

L is an at least trivalent nonfunctional linking group having from 1 to 60 carbon atoms and from 0 to 20 heteroatoms selected from the group consisting of oxygen, nitrogen, sulfur, phosphorus, and silane, and mixtures thereof. As used here, "nonfunctional" refers to the absence of groups which are reactive with crosslinking agents under traditional coating curing conditions.

Illustrative examples of suitable L groups are aliphatic or cycloaliphatic linking groups of from 1 to 60 carbons, aromatic linking groups of from 1 to 10 carbons, and mixtures thereof. Preferred L groups include aliphatic or cycloaliphatic groups of from 2 to 10 carbons. L may, and preferably will, include one or more heteroatoms via one or more divalent internal linking groups such as esters, amides, secondary carbamates, ethers, secondary ureas, ketones, and mixtures thereof. Internal linking groups selected from the group consisting of esters, secondary carbamates, and mixtures thereof, are more preferred, with esters being most preferred.

An example of preferred L groups are

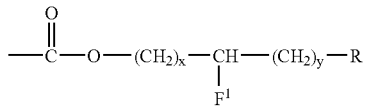

and isomers thereof, wherein $F^1$ and R are as described, x and y may the same or different and are from 0 to 10, preferably from 1 to 3, and is most preferably 1.

F, $F^1$ and $F^2$ are functional groups selected from the group consisting of primary carbamate groups, hydroxyl groups, and mixtures thereof, such as beta-hydroxy primary carbamate groups, with the proviso that at least one of $F^1$ and $F^2$ are a primary carbamate group or a beta-hydroxy primary carbamate group, and n is an integer from 0 to 3, most preferably 0.

The one or more film-forming components (b) will have a plurality of functional groups that may be reactive with one or more of other film-forming components (b), the functional groups (ii) of anti-popping component (a), the functional groups (iii) of crosslinking component (c) and mixtures thereof. However, most preferably, the one or more film-forming components (b) will be reactable only with the one or more functional groups (iii) of crosslinking component (c).

Thus, in a particularly preferred embodiment of the invention, anti-popping component (a) and one or more film-forming components (b) will not react with each other. Rather, in this most preferred embodiment, one or both of anti-popping component (a) and film-forming component (b) will react solely with the one or more functional groups (iii) of crosslinking component (c).

The reactions between the film-forming components (b) and either one or both of anti-popping component (a) and crosslinking component (c) may produce either reversible or irreversible chemical linkages as discussed above. In a most preferred embodiment, the functional groups of film-forming component (b) will be selected so that reaction with the functional groups (iii) of crosslinking component (c) produces a thermally irreversible chemical linkage. Any linkages produced by the reaction between the one or more film-forming components (b) and reactive component (a) may or may not be irreversible but will most preferably be irreversible. Most preferably, no reaction between film-forming components (b) and anti-popping component (a) will occur.

If reaction with film-forming component (b) is to produce a thermally irreversible linkage, the respective functional groups of the reactants must be selected from the above-identified pairs that produce thermally irreversible bonds. Thus, in a most preferred embodiment, the most preferred film-forming components (b) will have one or more functional groups selected from the above-identified pairs that produce thermally irreversible bonds and functional group (iii) of crosslinking component (c) will be the other corresponding member of the functional group "pair".

Film-forming or binder component (b) will generally be present in coating compositions used in the method of the invention in an amount of from 0 to 95% by weight, based on the total fixed vehicle of the coating composition. In a more preferred embodiment, film-forming components (b) will comprise from 20 to 95% by weight of the total fixed vehicle of the coating composition, and most preferably from 75 to 95% by weight, all based on the total fixed vehicle of the coating composition.

Coating compositions used in the method of the invention will further comprise a crosslinking component (c). Crosslinking component (c) will be used in amounts of from 1 to 90%, preferably from 3 to 75%, and more preferably from 25 to 50%, all based on the total fixed vehicle of the coating composition.

As discussed above, crosslinking component (c) will comprise functional groups (iii) that are reactive with one or both of anti-popping component (a) and one or more film-forming components (b), and most preferably with both components (a) and (b).

In a preferred embodiment, the reaction between crosslinking component (c) and anti-popping component (a) will produce a thermally irreversible bond as discussed above. It will be appreciated that in this case, the selection of functional groups (iii) will be dependent upon the selection of the functional groups of either anti-popping component (a) or one or more film-forming components (b). That is, the functional groups of crosslinking component (c) and the component reacting therewith must form one of the functional group "pairs" discussed above which result in thermally irreversible linkages.

For example, when the functional groups of either component (a) or (b) are hydroxyl, functional groups (iii) of crosslinking component (c) may be selected from the group consisting of isocyanate (blocked or unblocked), epoxy, and mixtures thereof, and most preferably will be isocyanate groups, whether blocked or unblocked.

Illustrative examples of epoxy functional crosslinking components (c) are all known epoxy functional polymers and oligomers. Preferred epoxy functional crosslinking agents are glycidyl methacrylate polymers and isocyanurate containing epoxy functional polymers such as trisglycidyl isocyanurate and the reaction product of glycidol with an isocyanate functional isocyanurate such as the trimer of isophorone diisocyanate (IPDI).

Illustrative examples of isocyanate functional crosslinking agents (c) are all known isocyanate functional polymers and oligomers. Preferred isocyanate functional crosslinking agents are isocyanato ethylacrylate polymers and the trimers of diisocyanates such as IPDI and hexamethylene diisocyanate (HDI), which may be blocked or unblocked.

When the functional groups of either anti-popping component (a) or a film forming component (b) are carboxyl, functional groups (iii) will most preferably be epoxy as described above.

When the functional groups of either anti-popping component (a) or a film-forming component (b) are carbamate, the functional groups (iii) of crosslinking component (c) may be selected from the group consisting of aminoplast resins, aldehydes, and mixtures thereof. Most preferably, when the functional groups of anti-popping component (a) and/or a film-forming component (b) are carbamate, functional groups (iii) of crosslinking component (c) will be aminoplast functional groups if a thermally irreversible linkage is desired. Alternatively, if thermally reversible linkages are sufficient, the functional groups (iii) of crosslinking component (c) may be isocyanate when the functional groups of components (a) and/or (b) are carbamate. In this case, the resulting link is an allophanate that can be made to be reversible during the cure schedule when Lewis acid catalysts such as dibutyl tin diacetate are used.

Illustrative examples of suitable aminoplast resins are melamine formaldehyde resins (including monomeric or polymeric melamine resin and partially or fully alkylated melamine resin), urea resins (e.g., methylol ureas such as urea formaldehyde resin, alkoxy ureas such as butylated urea formaldehyde resin), and carbamate formaldehyde resins.

When the functional groups of anti-popping component (a) and/or a film-forming component (b) are epoxy, functional groups (iii) may be carboxyl or hydroxyl, or mixtures thereof, carboxyl being most preferred.

Illustrative examples of carboxyl functional crosslinking components (c) are acid functional acrylics, acid functional polyesters, acid functional polyurethanes, and the reaction products of polyols such as trimethylol propane with cyclic anhydrides such as hexahydrophthalic anhydride. Such materials are known in the art.

When the functional groups of anti-popping component (a) and/or a film-forming component (b) are cyclic carbonate, functional groups (iii) should be amine if a thermally irreversible linkage is desired. An illustrative example of an amine functional crosslinking component (c) is triaminonoane. Anther example is the reaction product of a hydroxy ketamine resin which may be formed, for example, by the reaction of a hydroxy ketamine with an isocyanate functional material, oligomers or polymer.

Similarly, when the functional groups of anti-popping component (a) and/or a film-forming component (b) are amine, functional groups (iii) should be cyclic carbonate, isocyanate functional as described above, or mixtures thereof in order to obtain thermally irreversible linkages.

Cyclic carbonate functional crosslinking components (c) may be obtained by the reaction product of carbon dioxide with any of the above described epoxy functional crosslinking components (c). Alternatively, a cyclic carbonate functional monomer may be obtained by the reaction of carbon dioxide with an epoxy functional monomer such as glycidyl methacrylate or glycidol, followed by polymerization/oligomerization of the cyclic carbonate functional monomer. Additional methods of obtaining cyclic carbonate functional crosslinking agents are known in the art and may be used.

When the functional groups of anti-popping component (a) and/or a film-forming component (b) are isocyanate, functional groups (iii) may be hydroxy, amine or mixtures thereof in order to obtain thermally irreversible linkages, hydroxy being most preferred.

Hydroxy functional crosslinking components (c) are polyols, hydroxy functional acrylics, hydroxy functional polyesters, hydroxy functional polyurethanes, hydroxy functional isocyanurates and mixtures thereof as are known in the art.

The above noted crosslinking components (c) are also suitable for use in those embodiments where crosslinking component (c) is used to provide a thermally reversible bond. It will be appreciated that in this case, the respective functional groups will be selected so as not to form any of the above noted "pairs" which produce thermally irreversible groups.

Examples of functional groups that are reactive with each other and result in thermally reversible bonds are well known in the art. Illustrative examples are the reaction of aminoplasts with polyols, the reaction of cyclic anhydrides with polyols, and the reaction of activated secondary carbarnates such as TACT with hydroxy groups. Suitable examples of the individual components are discussed above and may be selected accordingly.

The coating composition used in the method of the invention may include a catalyst to enhance the cure reactions between anti-popping component (a), film-forming components (b) and crosslinking agent (c). For example, when aminoplast compounds, especially monomeric melamines, are used as crosslinking agents (c), a strong acid catalyst may be utilized to enhance the cure reaction. Such catalysts are well known in the art and include, without limitation, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

Additional agents, for example surfactants, fillers, stabilizers, wetting agents, dispersing agents, adhesion promoters, UV absorbers, hindered amine light stabilizers, etc. may be incorporated into the coating compositions used in the method of the invention. While such additives are well known in the prior art, the amount used must be controlled to avoid adversely affecting the coating characteristics.

The method of the invention may be used with coating compositions that function as primers, basecoats, topcoats, and/or clearcoats. Suitable coating compositions may be one, two or multicomponent coating compositions and may be in the form of powder coating compositions, powder slurry coating compositions, waterborne coatings/aqueous dispersions, or solvent borne coating compositions.

Illustrative powder coatings suitable for application in the method of the invention are those having the anti-popping component (a), a film-forming component (b) and a crosslinking component (c) as discussed above. In general, powder coatings suitable for use in the method of the invention may be prepared by processing a mixture of components (a), (b) and (c) by accepted powder compound manufacturing technology, for example via sheet, roll or drop techniques. After solidifying, the mixture is broken into particles having a desired size and shape. The average size and shape of the compound particles is dependent upon handling, processing, and equipment considerations.

Preferably, the compound will be in the shape of spheres, flat chips or discs having regular or irregular dimensions. Particles having an average particle size of from about 0.1 to 100 microns are suitable, with average particle sizes of from 1 to 75 microns preferred, with average particle sizes of from 15 to 45 microns most preferred. Particle size as used herein refers to the average diameter of an object having irregular boundaries that can be determined with known test methods.

Powder slurry compositions suitable for use in the method of the invention may be made by dispersing a solid particulate component in a liquid component. The solid particulate component may be a powder coating composition as described above or alternatively may be a solid particulate component comprising one or more of anti-popping component (a), film-forming component (b), and crosslinking component (c). The liquid component may be water, water soluble solvents, liquid crosslinking components and mixtures thereof. Illustrative liquid crosslinking components include liquid aminoplast resins.

During the preparation of suitable powder slurry compositions, the components may be combined and mixed well by conventional processes. A grinding or milling operation may follow such admixture. A preferred method of manufacture is disclosed in U.S. Pat. No. 5,379,947, hereby incorporated by reference. Powder slurry compositions can be applied by spray or by electrostatic deposition.

Illustrative waterborne coatings suitable for use in the claimed method will generally contain aqueous dispersions of organic binder components comprising anti-popping component (a) and optionally one or more of film-forming components (b) and/or crosslinking component (c). The dispersion of these components into water may occur with chemical aids, i.e., ionic and/or nonionic surfactants, dispersing and/or stabilizing resins; mechanical means via the high stress and/or high shear equipment such as microfluidizers and combinations thereof.

Illustrative ionic surfactants include ionic or amphoteric surfactants such as sodium lauryl sulfate. An example of a suitable commercially available ionic surfactant is ABEX EP 110 from Rhodia of Cranbury, N.J.

Illustrative nonionic surfactants include nonionic surfactants based on polyethoxylated alcohols or polyethoxypolyalkoxy block copolymers, polyoxyethylenenonylphenyl ethers, polyoxyethylenealkylallyl ether sulfuric acid esters and the like.

Mechanical means such as high stress techniques can also be used to prepare suitable aqueous dispersions. Alternative modes of applying stress to a mixture of water and organic binder component can be utilized so long as sufficient stress is applied to achieve the requisite particle size distribution. For example, one alternative manner of applying stress would be the use of ultrasonic energy.

A preferred high stress technique for preparing aqueous dispersions uses a MICROFLUIDIZER® emulsifier, available from Microfluidics Corporation in Newton, Mass. The MICROFLUIDIZER® high-pressure impingement emulsifier is patented in U.S. Pat. No. 4,533,254. The device consists of a high-pressure (up to 25,000 psi) pump and an interaction chamber where the emulsification takes place. Generally, the mixture of organic binder component and water is passed through the emulsifier once at a pressure between 5,000 and 15,000 psi. Multiple passes can result in smaller average particle size and a narrower range for the particle size distribution.

Mechanical means such as high stress techniques may also be combined with the chemical dispersion aids such the surfactants such as discussed above or the stabilizing and/or dispersing resins discussed below. Most preferably, the high stress techniques will be combined with suitable chemical aids, especially stabilizing resins and/or dispersing resins.

Illustrative examples of suitable dispersing and/or stabilizing resins or polymers are the hydroxyl-containing emulsifiers taught in U.S. Pat. No. 6,309,710 and various non-polyalkoxylated stabilizing resins.

Suitable hydroxyl-containing emulsifiers are preferably diols and/or polyols having emulsifying properties, with particular preference diols and/or polyols having a molecular weight of between 500 and 50,000 daltons; with very particular preference, having a molecular weight of between 500 and 10,000 daltons and, in particular, from 500 to 5000 daltons. The emulsifying diols and/or polyols are preferably selected from the group of the polyacrylate-diols and/or -polyols, polyester-diols and/or -polyols and polyether-diols and/or -polyols, and, with very particular preference, from the group of the polyurethane-diols and/or -polyols, polycarbonate-diols and/or -polyols, and polyether-diols and/or polyols.

The ratio of hydrophilic to hydrophobic moieties in the diols and/or polyols is preferably established either by way of the molecular weight of the diols and/or polyols and the fraction of hydrophilic groups already present in the diol and/or polyol, or by the introduction of additional hydrophilic groups, such as acid groups or salts thereof, examples being carboxyl or carboxylate groups, sulfonic acid or sulfonate groups, and phosphonic acid or phosphonate groups.

Particularly preferred polyether-diols and/or -polyols are block copolyethers consisting of ethylene oxide and propylene oxide units, the proportion of ethylene oxide units being from 30 to 50% and the proportion of propylene oxide units being from 50 to 70% by weight. The molecular weight is preferably around 9000 daltons. Emulsifiers of this kind are sold, for example, by BASF AG under the trade name Pluronic.RTM. PE 9400.

A particularly preferred stabilizing resin is an acrylic copolymer having a plurality of functional groups that impart water dispersibility. Such stabilizing resins are the free radical polymerization product of one or more hydrophobic ethylenically unsaturated monomers and one or more hydrophilic ethylenically unsaturated monomers, such monomers being used in an appropriate ratio so as to achieve the desired degree of stabilization. It will be appreciated that the plurality of stabilizing or water dispersible functional groups will typically be incorporated into the copolymer via the polymerization of the hydrophilic monomers.

Most preferred stabilizing resins will normally have a number average molecular weight of from 5000 to 50,000, preferably from 10,000 to 25,000, with molecular weights of from 15,000 to 20,000 being most preferred. Most preferred stabilizing resins will further have an acid number of from 40 to 60, preferably 42 to 52, and most preferably 44 to 48.

The functional groups that impart water dispersibility or stability to the stabilizing resin can be anionic, cationic, or nonionic. Anionic and nonionic groups are most preferred because of the tendency of the cationic groups, (i.e., amine) groups to cause yellowing in any final cured coating.

Suitable hydrophobic ethylenically unsaturated monomers are vinyl esters, vinyl ethers, vinyl ketones, aromatic or heterocyclic aliphatic vinyl compounds, and alkyl esters having more than 4 carbon atoms of alpha, beta-ethylenically unsaturated mono- or dicarboxylic acids containing 3 to 5 carbons. Preferred are the aromatic or heterocyclic aliphatic vinyl compounds and the C4 or greater alkyl esters of alpha, beta-unsaturated monocarboxylic acids such as acrylic or methacrylic acid.

Representative examples of suitable esters of acrylic, methacrylic, and crotonic acids include, without limitation, those esters from reaction with saturated aliphatic and cycloaliphatic alcohols containing from 4 to 20 carbon atoms, such as n-butyl, isobutyl, tert-butyl, 2-ethylhexyl, lauryl, stearyl, cyclohexyl, trimethylcyclohexyl, tetrahydrofurfuryl, stearyl, and sulfoethyl. Preferred are alkyl esters of from 4 to 12 carbon atoms, with alkyl esters of from 4 to 10 carbon atoms being most preferred. 2-ethylhexyl acrylate is especially preferred.

Representative examples of aromatic or heterocyclic aliphatic vinyl compounds include, without limitation, such compounds as styrene, alpha-methyl styrene, vinyl toluene, tert-butyl styrene, and 2-vinyl pyrrolidone. Styrene is a most preferred example.

Most preferred hydrophobic monomers for use in making stabilizing resins for use in waterborne coating compositions for use in the method of the invention are styrene, ethylhexyl acrylate, and butyl methacrylate.

Suitable hydrophilic ethylenically unsaturated monomers are those that act to stabilize both the stabilizing resin and organic binder component in the aqueous dispersion. Illustrative examples are low molecular weight alkyl acrylate esters that allow hydrogen bonding, weak hydrogen bond donors, strong hydrogen bond donors, and hydrogen bond acceptors based on polyethers.

For example, low molecular weight alkyl esters of alpha, beta-ethylenically unsaturated monocarboxylic acids having alkyl groups of less than three carbons may be used as the hydrophilic monomers. Representative examples include the esters of acrylic and methacrylic acid with saturated aliphatic alcohols of three or less carbons atoms, i.e., methyl, ethyl, and propyl.

Suitable weak hydrogen bond donors are those ethylenically unsaturated monomers having functional groups such as hydroxyl, carbamate, and amide. Carbamate functional ethylenically unsaturated monomers may also be used. Hydroxyl functional ethylenically unsaturated monomers such as hydroxyalkyl acrylates and methacrylates are also suitable. Representative examples include, without limitation, hydroxy ethyl acrylate, hydroxyethyl methacrylate, and the like. Also suitable are acrylic and methacrylic acid amides and aminoalkyl amides, acrylonitrile and methacrylonitrile.

Strong hydrogen bond donors such as strong acids are also suitable for use as the hydrophilic monomers. Useful ethylenically unsaturated acids include alpha,beta-olefinically unsaturated monocarboxylic acids containing 3 to 5 carbon atoms, alpha,beta-olefinically unsaturated dicarboxylic acids containing 4 to 6 carbon atoms and their anhydrides, unsaturated sulfonic acids, and unsaturated phosphonic acids. Representative examples include, without limitation, acrylic acid, methacrylic acid, crotonic acid, fumaric acid, maleic acid, itaconic acid and their respective anhydrides. Acrylic and methacrylic acid are most preferred.

Polyether based hydrogen bond acceptors may also be used in the most preferred stabilizing resin. Useful ethylenically unsaturated polyethers include ethylene oxide and the alkoxy poly(oxyalkylene) alcohol esters or amides of alpha,beta-olefinically unsaturated monocarboxylic acids containing 3 to 5 carbon atoms. The alkoxy poly(oxyalkylene) alcohol or alkoxy poly(oxyalkylene) amine employed in forming the monomer can be obtained by the alkoxylation of monohydric alcohols with ethylene oxide or mixtures of ethylene oxide with other epoxides of up to ten carbon atoms, such as propylene oxide or butylene oxide.

The residue of the alkoxy poly(oxyalkylene) alcohol or amine contained in an acrylic polymer suitable as the most preferred stabilizing resin can be represented by $D(CH(R_1)CH_2O-)_nR_2$, and is either alkoxy polyoxyethylene or an alkoxy polyoxyethylene/polyoxyalkylene copolymer, having a degree of polymerization of n, n being an integer from one to one thousand. D is 0 in the case of the alkoxy poly(oxyalkylene) alcohol and NH in the case of the amine. Preferably, n is an integer from 20 to 200; more preferably, from 40 to 70. $R_1$ is thus either hydrogen or a mixture of hydrogen and alkyls of one to eight carbon atoms. It is particularly advantageous for $R_1$ to be either hydrogen or a mixture of hydrogen and alkyls of one to three carbon atoms. $R_2$ is an alkyl of one to thirty carbon atoms. $R_2$ is preferably an alkyl of one to ten carbon atoms. In one embodiment, $R_1$ can be hydrogen and $R_2$ can be methyl.

Preferably, the hydrophilic monomers used to make suitable stabilizing resins will have functional groups selected from the group consisting of carboxylic acid groups, hydroxyl groups, oxirane groups, amide groups, and mixtures thereof. Most preferably, hydrophilic monomers having a mixture of acid groups, hydroxyl groups, and carbamate groups will be used. However, hydrophilic monomers having carboxylic acid groups will preferably be minimized as much as possible to avoid negative effects in finished film properties. Most preferred hydrophilic monomers are acrylic acid, hydroxy ethyl acrylate and hydroxy ethyl methacrylate.

In a preferred embodiment, the method of the invention will involve the application of waterborne, solvent borne or powder coating compositions. In a most preferred embodiment, the applied coating composition will be a waterborne coating composition.

The method of the invention can be used to provide cured coating films wherein the applied coating compositions are high-gloss coatings and/or clearcoats of composite color-plus-clear coatings. High-gloss coatings may be described as those coatings which provide cured coating films having a 20° gloss or more (ASTM D523-89) or a DOI (ASTM E430-91) of at least 80.

Notwithstanding the preference for use of the method in making composite color-plus-clear systems, the method of the invention may also be used to make cured coating films wherein the applied coating composition is a basecoat such as a high-gloss pigmented paint coating. In this case, the coating composition used in the method of the invention may comprise one or more pigments such as any organic or inorganic compounds or colored materials, fillers, metallic or other inorganic flake materials such as mica or aluminum flake, and other materials of the kind that the art normally includes in such coatings. Pigments and other insoluble particulate compounds such as fillers are usually used in the composition in an amount of 1% to 100%, based on the total solid weight of binder component (a) and crosslinking component (c) and any other film-forming components. (i.e., a pigment-to-binder ratio of 0.1 to 1).

The method of the invention requires the application of a coating composition to a substrate. Suitable substrates may be any surface capable of being coated and subjected to conditions sufficient to effect curing of the applied coating. Especially suitable substrates are those typically encountered in the transportation/automotive industries. Illustrative examples include metal substrates such as steel, aluminum, and various alloys, flexible plastics, rigid plastics and plastic composites. Metal substrates and rigid plastic substrates are preferred.

It is an aspect of the invention that suitable substrates may or may not have been coated prior to the use of the method of the invention. Illustrative examples include electrocoated substrates, primed substrates, basecoated substrates, and mixtures thereof. In a preferred embodiment, the substrate used in the method of the invention will be a coated film applied to a substrate such as described above.

The coated film on the substrate may be a cured or uncured coating film. In a preferred embodiment, the substrate to be used in the method of the invention will be an uncured, previously applied coating film, most preferably a substrate coated with an uncured pigmented basecoat that is part of a composite color-plus-clear coating system. In this most preferred embodiment, the coating composition to be applied as part of the method of the invention will be a clearcoat coating composition.

In this most preferred embodiment, the uncured coated film over which the clearcoat coating composition is applied over may be any pigmented basecoat composition such as are known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups. Pigmented basecoats serving as the substrate in the method of the invention may comprise pigments such as those discussed above with regards to pigmented coating compositions used in the method of the invention.

The method of the invention requires that the coating composition be applied in an amount such that a cured coating film of at least 2.0 mils/50.8 microns results. In general, liquid coatings intended for use in the automotive OEM applications have a finished film build goal in the range of from at least 1.3 mils/33.0 microns, more particularly from 1.3 to 3.0 mils/33.0 to 76.2 microns, and most preferably from 1.3 to 2.0 mils/33.0 to 50.8 microns. However, application inconsistencies often result in fatty or thick edges, and heavy film builds greater than 2.0 mils/50.8 microns the cured film. Thus, the method of the invention is therefore intended to provide greater pop tolerance at cured film builds of at least 2.0 mils/50.8 microns, more preferably at cured film builds of at least 2.5 mils/63.5 microns, and most preferably at cured film builds of at least 3.0 mils/76.2 microns.

In general, the method of the invention will use curable coating composition having a % NV (nonvolatile) of from 20% to 100%, with liquid coatings generally having a % NV of from 20 to 80% and powder coatings having a % NV of approximately 100%. Thus, in the method of the invention the curable coating composition will generally be applied so as to result in an uncured coating film of from about 2.6 to 6.0 mils/66.0 to 152.4 microns, and more preferably in an uncured coating film of from about 3.0 to 4.8 mils/76.2 to 121.9 microns and most preferably from about 3.6 to 4.6 mils/91.4 to 116.8 microns. To provide cured liquid coating of at least 2.0 mils/50.8 microns, preferably from at least 2.5 mils/63.5 microns, and most preferably of at least 3.0 mils/76.2 microns, the liquid coating composition will have to be correspondingly applied in uncured film builds of from 2.5 mils/63.5 to 15 mils/381 microns. It will be appreciated that to provide cured powder coating films of at least 2.0 mils/50.8 microns, preferably from at least 4.0 mils/101.6 microns, and most preferably of at least 6.0 mils/152.4 microns, the uncured powder coating composition will be applied in the same corresponding film build.

The pop tolerance or resistance of the coating compositions applied in the method of the invention can be evaluated by the application of a coating composition to a substrate in a film build gradient. That is, the coating composition will be applied to the substrate so that the film build increases from one end of the substrate to the other, most generally from top to bottom. After curing, the resulting cured coating film is visually inspected for popping defects. The film build at which popping defects are first noted is the pop resistance or pop tolerance of the applied coating composition. Thus, a coating composition having a particular pop tolerance will generally only show popping defects when applied in a film build of that particular thickness. The greater the film build at which popping defects are first observed, the greater the pop tolerance or resistance a coating composition possesses.

The coating compositions described herein are preferably subjected to conditions so as to cure the applied coating layers. Although various methods of curing may be used, heat curing is preferred. Generally, heat curing is effected by exposing the coated article to elevated temperatures provided primarily by radiative heat sources. Curing temperatures will vary depending on the particular blocking groups used in the cross-linking agents, however they generally range between 90° C. and 180° C.

In a preferred embodiment, the cure temperature is preferably between 115° C. and 150° C., and more preferably at temperatures between 115° C. and 140° C. for a blocked acid catalyzed system. For an unblocked acid catalyzed system, the cure temperature is preferably between 80° C. and 100° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

EXAMPLES

Example 1

Part a

Preparation of an Anti-popping Component (a)

A mixture of 59.4 parts of Pripol™ saturated fatty acid dimer diol, (commercially available from Uniqena), 20.1 parts methyl carbamate, 20.4 parts toluene and 0.09 parts of dibutyl tin oxide are heated to reflux. Once at reflux, the methanol is removed from the reaction mixture and the toluene is allowed to return to the reaction mixture. After 96% of the hydroxy groups are converted to primary carbamate groups, the excess methyl carbamate and toluene are removed by vacuum distillation. A dicarbamate functional anti-popping component (a) was obtained.

Part b

Preparation of Organic Binder Component

| Material | Amount |
| --- | --- |
| Anti-popping component (a) from part (a) | 92.2 |
| Acrylic dispersing resin[1] | 68.8 |
| AMP solution[2] | 1.7 |
| Deionized water | 144.6 |

[1]The acrylic dispersing resin is a 67% NV resin in propylene glycol propyl ether, and has a acid number of 48 and a hydroxy number of 64.
[2]AMP solution is a 20% solution in deionized water of 2-amino-2-methyl-1-propanol.

Anti-popping component (a) was heated in a water bath to its melting point. The molten component (a) was then mixed with the acrylic dispersing resin. A solution of 20% 2-amino-2methyl-1-propanol in deionized water was then added under agitation to the mixture. Deionized water was added to achieve a theoretical non-volatile content of 45%.

Part c

Preparation of Waterborne Clearcoat According to the Invention

To 155.5 parts of the organic binder component from part b, the following ingredients were added:

| Material | Amount (on paint NV) |
| --- | --- |
| Hexamethoxymethyl melamine | 30.0 |
| DDBSA[3] | 4.0 |

[3]Diisopropanolamine salt of dodecylbenzene sulfonic acid, 25% active in methanol Deionized water was then added to the resulting paint mixture to reduce viscosity to 180 mPas at a shear rate of 375/sec.

Part d

Use of the Method of the Invention

An acrylic/melamine red metallic waterborne basecoat was spray applied to a 4 inch/10.16 cm by 18 inch/45.72 cm electrocoated steel panel with a hand spray siphon gun to achieve 0.9 mils/22.86 microns of dry film. The panel was then flashed for 5 minutes at 140° F./60° C. After allowing the panel to cool to room temperature, the clearcoat of part c was applied with a hand spray siphon gun to achieve a gradient of film thickness down the panel. The panel was flashed for 10 minutes at room temperature, and 10 minutes at 140° F./60° C. It was then transferred to a 270° F./132° C. oven and baked for 25 minutes. Clearcoat film thickness was measured along the length of the panel, and the point at which clearcoat popping occurred was noted. Pop tolerance was measured to be greater than 2.7 mils/68.58 microns of clearcoat.

Example 2

Part a

Preparation of a Mixture Containing an Anti-popping Component (a) and a Film-forming Component (b)

A mixture of 30 parts of a tri-carbamate functional material as described in Example 1 of U.S. Pat. No. 5,336,566 but with all of the solvent removed and 70 parts of the anti-popping component (a) from Example 1, part a was mixed together. The mixture was stirred on a hot plate until a homogenous mixture was obtained.

Part b

Preparation of Organic Binder Component

Using the technique of Example 1, part b, an organic binder component was prepared using the following materials.

| Material | Amount |
| --- | --- |
| Mixture from Ex. 2, part b | 268.0 |
| Acrylic Dispersing resin[4] | 197.2 |
| AMP solution[5] | 6.8 |
| Deionized water | 480.4 |

[4]Same acrylic dispersing resin as used in Example 1.
[5]Same AMP solution as used in Example 1.

Part c

Preparation of Waterborne Clearcoat

Using the technique of example 1, part c, a waterborne clearcoat was produced using the following materials.

| Material | Amount (on paint NV) |
| --- | --- |
| Organic binder component from Example 2, part b | 534.1 |
| Hexamethoxymethyl melamine | 125.7 |
| Acrysol RM8W | 10.2 |
| BYK345 | 7.7 |
| DDBSA[6] | 14.0 |

[6]Same as DDBSA used in Example 1.

Part d

Use of the Method According to the Invention

The clearcoat composition was evaluated per the procedure used in part d of Example 1. Pop tolerance was measured to be 1.9 mils/48.3 microns of clearcoat.

The invention claimed is:

1. A method of making a cured coating film having an average film build of at least 2.0 mils/50.8 microns which is substantially free of popping defects, comprising applying a curable coating composition to a substrate to form a coated uncured substrate having an average film build of at least 2.0 mils/50.8 microns, the curable coating composition comprising an anti-popping component (a), a film-forming component (b), and a crosslinking component (c), wherein anti-popping component (a) has from 12 to 72 carbon atoms, is substantially free of any heteroatoms, is not a crystalline solid at room temperature and comprises a mixture of two or more structures selected from the group consisting of aliphatic structures for anti-popping component (a), aromatic-containing structures for anti-popping component (a), cycloaliphatic-containing structures for anti-popping component (a), and mixtures thereof, wherein at least one of the two or more structures is either a cycloaliphatic-containing structure or an aromatic-containing structure, subjecting the coated uncured substrate to conditions sufficient to form a continuous cured coating film having an average film build of at least 2.0 mils/50.8 microns and which is substantially free of popping defects, wherein the anti-popping component (a) comprises a least two functional groups reactive with one or both of film-forming component (b) and crosslinking component (c).

2. The method of claim 1 wherein the reaction between anti-popping component (a) and one or both of film-forming component (b) and crosslinking component (c) results in thermally irreversible linkages.

3. The method of claim 1 wherein the curable coating composition is a waterborne coating composition.

* * * * *